United States Patent
Zhang et al.

(10) Patent No.: US 9,499,672 B2
(45) Date of Patent: Nov. 22, 2016

(54) METHODS FOR PREPARING STABLE UREA FORMALDEHYDE POLYVINYL ALCOHOL COLLOIDS

(71) Applicant: Hexion Inc., Columbus, OH (US)

(72) Inventors: Yingchao Zhang, Louisville, KY (US); David A. Snover, Floyds Knobs, IN (US)

(73) Assignee: HEXION INC., Columbus, OH (US)

( * ) Notice: Subject to any disclaimer, the term of this patent is extended or adjusted under 35 U.S.C. 154(b) by 0 days.

(21) Appl. No.: 14/943,943

(22) Filed: Nov. 17, 2015

(65) Prior Publication Data

US 2016/0068637 A1     Mar. 10, 2016

Related U.S. Application Data

(62) Division of application No. 14/340,277, filed on Jul. 24, 2014, now Pat. No. 9,217,046.

(51) Int. Cl.
| | |
|---|---|
| *C08G 63/48* | (2006.01) |
| *C08F 8/00* | (2006.01) |
| *C08G 81/02* | (2006.01) |
| *C08F 16/06* | (2006.01) |
| *C08F 8/30* | (2006.01) |
| *C08L 61/24* | (2006.01) |

(52) U.S. Cl.
CPC ............... *C08G 81/024* (2013.01); *C08F 8/30* (2013.01); *C08F 16/06* (2013.01); *C08L 61/24* (2013.01); *C08L 2201/56* (2013.01)

(58) Field of Classification Search
CPC . C08G 81/024; C08L 61/24; C08L 2201/56; C08F 16/06; C08F 8/30

USPC ...................................................... 525/58, 61
See application file for complete search history.

(56) References Cited

U.S. PATENT DOCUMENTS

| | | | |
|---|---|---|---|
| 3,515,581 A | 6/1970 | Isaksen et al. | |
| 3,554,947 A | 1/1971 | Maruta et al. | |
| 3,759,736 A | 9/1973 | Jenny et al. | |
| 4,247,487 A * | 1/1981 | Percy | C07C 45/86 568/422 |
| 4,530,713 A | 7/1985 | Williams et al. | |
| 4,604,448 A | 8/1986 | Farkas et al. | |
| 6,746,781 B2 | 6/2004 | Francis et al. | |
| 7,927,459 B2 | 4/2011 | Huang et al. | |
| 8,080,171 B2 | 12/2011 | Lee et al. | |
| 2013/0337272 A1 | 12/2013 | Zhang et al. | |
| 2013/0337712 A1 | 12/2013 | Zhang et al. | |
| 2014/0033950 A1 | 2/2014 | Saha | |

FOREIGN PATENT DOCUMENTS

| | | |
|---|---|---|
| WO | WO 2009/005977 A1 | 1/2009 |
| WO | WO 2012/177181 A1 | 12/2012 |
| WO | WO 2013/188541 A2 | 12/2013 |
| WO | WO 2014022654 A2 | 2/2014 |

* cited by examiner

*Primary Examiner* — William Cheung

(57) ABSTRACT

The mechanical properties of urea formaldehyde resins may be improved by incorporating therein polyvinyl alcohol. The polyvinyl alcohol may be incorporated during pre-mixing, mid mixing, and/or post mixing of the resin components. Resins prepared using polyvinyl alcohol are particularly desirable in articles requiring improved mechanical strength and water resistance, as compared to similar resins prepared without the polyvinyl alcohol such as shingles.

8 Claims, No Drawings

METHODS FOR PREPARING STABLE UREA FORMALDEHYDE POLYVINYL ALCOHOL COLLOIDS

RELATED APPLICATION DATA

This application is a divisional application of U.S. patent application Ser. No. 14/340,277, filed Jul. 24, 2014, now issued as U.S. Pat. No. 9,217,046, of which the entire content of the application is hereby incorporated by reference.

BACKGROUND OF THE INVENTION

1. Field of the Invention

The present invention relates to urea formaldehyde colloids. The present invention particularly relates to methods of preparing urea formaldehyde polyvinyl alcohol colloids.

2. Background of the Art

Historically, asphalt roofing shingles were made from organic felt mats, principally formed from randomly arranged chopped cellulose fibers that are saturated with a hot asphalt and subsequently formed into asphalt roof shingles. In contrast, for modern applications, wet laid glass fiber mats have replaced the cellulose felt mats which provide increased service life, strength and improved fire resistance.

Unfortunately, fiberglass lacks the natural inter-fiber bonding that is inherent in the natural organic fiber such as cellulose. The chopped glass fibers when randomly disposed in a mat must be bonded together by a suitable binder. The binder adhesively secures crossed glass fibers together contributing to good handling of the mats during processing into fiberglass shingles as well as providing the necessary physical performance properties such as strength, flexibility and long life that is required during roof installation and during the service life of the roof.

As with any commercial concern, when making fiberglass reinforced shingles or any other fiberglass product, it is desirable that useful binders be as cost effective as possible while also having the necessary physical properties. In some aspects, urea-formaldehyde resins are desirable for this application. They are low-cost thermoset materials having a good adhesion, a fast cure rate, desirable mechanical properties, and a lengthy shelf life.

Unfortunately, urea formaldehyde resins without some form of modification may not have sufficient mechanical properties. It has sometimes been observed that fiberglass sheathing prepared with urea formaldehyde resin binders may break during the production of glass mats for the use in the production of shingles. This shortcoming may be overcome however, through the use of water born polymers, such as, emulsion, dispersion and water-soluble polymers. One such waterborne polymer is polyvinyl alcohol.

Polyvinyl alcohol can be readily crosslinked with urea-formaldehyde resin at elevated temperatures to improve mechanical properties of urea-formaldehyde-based binder and also improve water resistance. However, urea-formaldehyde resin and polyvinyl alcohol water solution form a two-phase system due to immiscibility or limited compatibility, depending on the molecular weight (MW), degree of hydrolysis of polyvinyl alcohol, and solid content of the formulation. Currently, it is customary in the art of making polyvinyl alcohol resin, that less than 1% by weight, is mixed with urea-formaldehyde resin to enhance the urea-formaldehyde resin performance or add the small amount of urea-formaldehyde resin into polyvinyl alcohol solution to improve polyvinyl alcohol water resistance in commercial products. It would be desirable in the art to be able to increase the amount of polyvinyl alcohol introduced into a urea formaldehyde resin to improve its performance as a binder.

SUMMARY OF THE INVENTION

In one aspect, the invention is a method for preparing polyvinyl alcohol and urea-formaldehyde colloid including: admixing polyvinyl alcohol with a component selected from the group consisting of: a solution of formaldehyde, and a urea/formaldehyde concentrate, to form a first liquid working admixture and then admixing the first liquid working admixture with urea under reaction conditions sufficient to initiate a methylolation reaction to form an intermediate product admixture; subjecting the intermediate product admixture to reaction conditions sufficient to initiate condensation to form a colloid. Additionally, in some embodiments, the method includes completing the process by making final urea post addition to produce a polyvinyl alcohol and urea-formaldehyde resin colloid.

In another aspect, the invention is a method for preparing polyvinyl alcohol and urea-formaldehyde colloid including: admixing a component selected from the group consisting of: a solution of formaldehyde and a urea/formaldehyde concentrate, with urea under reaction conditions sufficient to initiate a methylolation reaction to form an intermediate product admixture; subjecting the intermediate product admixture to reactions conditions sufficient to initiate condensation to form a second intermediate product admixture; admixing the second intermediate product admixture with polyvinyl alcohol to from a final intermediate liquid product including a polyvinyl alcohol and urea-formaldehyde colloid. Additionally in some embodiments the method includes completing the process by making final urea post addition to produce a polyvinyl alcohol and urea-formaldehyde resin colloid.

In still another aspect, the invention is a method for preparing polyvinyl alcohol urea-formaldehyde resin colloid including: adding polyvinyl alcohol to a urea-formaldehyde resin under reaction conditions sufficient to condense the polyvinyl alcohol and the urea-formaldehyde resin to produce a polyvinyl alcohol and urea-formaldehyde resin colloid wherein the addition of polyvinyl alcohol is at a concentration sufficiently low to be compatible with the urea-formaldehyde resin solution into which it is being placed; measuring a property of the polyvinyl alcohol grafted urea-formaldehyde resin; determining whether the property of the polyvinyl alcohol grafted urea-formaldehyde resin meets a predetermined standard and taking an action selected from the group consisting of: (a) if the property of the polyvinyl alcohol grafted urea-formaldehyde resin meets the predetermined standard, stop processing; and (b) if the property of the polyvinyl alcohol grafted urea-formaldehyde resin does not meet the predetermined standard, further processing the polyvinyl alcohol grafted urea-formaldehyde resin the further processing including: adding additional polyvinyl alcohol to the polyvinyl alcohol and urea-formaldehyde resin colloid under reaction conditions, sufficient to condense the polyvinyl alcohol and the polyvinyl alcohol and urea-formaldehyde resin colloid to produce a further processed polyvinyl alcohol and urea-formaldehyde resin colloid wherein the addition of polyvinyl alcohol is at a concentration compatible with the polyvinyl alcohol and urea-formaldehyde resin colloid into which it is being placed; measuring a property of the further processed polyvinyl alcohol and urea-formaldehyde resin colloid; comparing the property of the further processed polyvinyl alcohol and urea-formaldehyde resin colloid to a predetermined standard; and repeating the further processing until the further processed polyvinyl alcohol and urea-formaldehyde resin colloid meets the predetermined standard.

Another aspect of the invention is a binder prepared using a polyvinyl alcohol urea-formaldehyde resin colloid prepared using any of the methods described above. These binders are particularly useful for preparing shingles.

DESCRIPTION OF THE PREFERRED EMBODIMENTS

One embodiment of the invention is a polyvinyl alcohol and urea-formaldehyde colloid. In the method for preparing polyvinyl alcohol and urea-formaldehyde colloid, the method includes: admixing polyvinyl alcohol with a component selected from the group consisting of: a solution of formaldehyde and a urea/formaldehyde concentrate, to form a first liquid working admixture and then admixing the first liquid working admixture with urea under reaction conditions sufficient to initiate a methylolation reaction to form an intermediate product admixture; subjecting the intermediate product admixture to reaction conditions sufficient to initiate a condensation reaction; and completing the process by making a final urea post addition to produce a polyvinyl alcohol and urea-formaldehyde resin colloid.

For the purposes of this application, the term polyvinyl alcohol (hereinafter sometimes PVA) is defined to mean compounds having the general idealized formula:

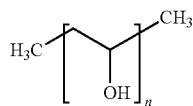

wherein "n" is not strictly defined. These compounds are resins containing various percentages of hydroxyl and usually acetate groups or other functional groups and are normally produced by hydrolysis of polyvinyl acetate or other polymer that is capable of being hydrolyzed. The PVA useful with embodiments of the invention will have a weight average molecular weight of from about 1,000 to about 200,000. In some embodiments the weight average molecular weight will be from about 10,000 to about 100,000. In still other embodiments the weight average molecular weight will be from about 10,000 to about 50,000.

In some embodiments of the application, admixing the first working admixture with urea under reaction conditions sufficient to initiate a methylolation reaction to form an intermediate product admixture is part of the method. A methylolation reaction is one where urea and formaldehyde in alkaline or slightly acidic solution (formaldehyde/urea >1.8-2.4) leads to urea-methylols or urea-hydroxymethyl species. For the purposes of the present application, the reactants are urea and formaldehyde; and/or urea and prepolymers of urea and formaldehyde. In some embodiments, the conditions for methylolation will be a temperature of about 80° C. and a pH of from about 8.5 to about 9.5. The pH may be adjusted using any method known to be useful to those of ordinary skill in the art. For example, triethylamine and triethanolamine may be used.

In some embodiments of the invention, the method continues to a condensation phase after methylolation. Conditions known to be useful to those of ordinary skill in the art of preparing urea formaldehyde resins may be employed with the embodiments of the application. For example, in some embodiments, the condensation may be started and controlled by lowering the pH to from about 5 to about 6 and then heating the reaction solution to about 80-100° C.

This reaction may then be completed by making a final urea post addition. One of ordinary skill in the art will well know how to determine the final urea addition in order to achieve a specific property or properties. These first embodiments may be described as an early addition or a "premixing" approach of polyvinyl alcohol and the other components of the resin.

In a "mid mixing" approach, the colloid is prepared by admixing a component selected from the group consisting of: a solution of formaldehyde and a urea/formaldehyde concentrate, with urea under reaction conditions sufficient to initiate a methylolation reaction to form an intermediate product admixture. This embodiment continues by then subjecting the intermediate product admixture to reactions conditions sufficient to initiate a condensation reaction to form a second intermediate product admixture; admixing the second intermediate product admixture with polyvinyl alcohol to form a final intermediate product solution; and completing the process by making final urea post addition.

Another approach to the method of the application is a "post mixing" approach. In these embodiments, the polyvinyl alcohol is added to a urea-formaldehyde resin under reaction conditions sufficient to react the polyvinyl alcohol and the urea-formaldehyde resin to produce a polyvinyl alcohol and urea-formaldehyde resin colloid wherein the addition of polyvinyl alcohol is at a concentration sufficiently low to be compatible with the urea-formaldehyde resin solution into which it is being placed. This embodiment of the methods of the application continues by measuring a property of the polyvinyl alcohol grafted urea-formaldehyde resin; determining whether the property of the polyvinyl alcohol grafted urea-formaldehyde resin meets a predetermined standard and taking an action selected from the group consisting of: (a) if the property of the polyvinyl alcohol grafted urea-formaldehyde resin meets the predetermined standard, stop processing; and (b) if the property of the polyvinyl alcohol grafted urea-formaldehyde resin does not meet the predetermined standard, further processing the polyvinyl alcohol grafted urea-formaldehyde resin, the further processing including: adding additional polyvinyl alcohol to the polyvinyl alcohol and urea-formaldehyde resin colloid under reaction conditions, sufficient to condense the polyvinyl alcohol and the polyvinyl alcohol and urea-formaldehyde resin colloid to produce a further processed polyvinyl alcohol and urea-formaldehyde resin colloid wherein the addition of polyvinyl alcohol is at a concentration compatible with the polyvinyl alcohol and urea-formaldehyde resin colloid into which it is being placed. The method continues by measuring a property of the further processed polyvinyl alcohol and urea-formaldehyde resin colloid; comparing the property of the further processed polyvinyl alcohol and urea-formaldehyde resin colloid to a predetermined standard; and repeating the further processing until the further processed polyvinyl alcohol and urea-formaldehyde resin colloid meets the predetermined standard.

One predetermined standard useful with all of the methods of the application, but especially the post mixing method is turbidity. It would be desirable in the art to produce colloids that are clear to hazy or at least not too turbid. In some embodiments, the colloids produced with the methods of the application have a turbidity of less than about 200 nephlometric turbidity units (NTU). In other embodiments, the colloids produced with the methods of the application have a turbidity of less than about 100 NTU. For comparison, drinking water typically has a turbidity of less than about 5 NTU.

The UF resins of the application may be prepared using urea and formaldehyde, but sometimes it is desirable to use a concentrate rather than the pure raw materials. It is common in the art use to UFC-85 which is available from many vendors. Generally speaking, it is covered under CAS No.: 9011-5-6 and will have a urea content of about 25% and a formaldehyde content of about 60%, the remaining material being water.

In addition to PVA, other water soluble polymers may be useful for formation of a colloid with UF. For example, hydroxyethyl cellulose could be used. These water soluble polymers can be employed just as the PVA. Water soluble polymers that can be used include, but are not limited to: hydroxyethyl cellulose (HEC), polyethylene glycol, polypropylene glycol, and polyethylene vinyl glycol. The use of HEC is illustrated below in Examples 13-15.

In some embodiments of the application, polyvinyl alcohol is used to form a colloid with a urea-formaldehyde resin. One end use for this colloid is as a binder for making shingles. Advantageously, the colloids of the application have low turbidity and good shelf life.

The PVA-UF colloids prepared by the method of the application may be employed in the same manner as a conventional UF resin. For example, like UF resin, the PVA-UF colloid is compatible some acrylic and/or vinyl emulsions.

EXAMPLES

The following examples are provided to illustrate aspects of the invention. The examples are not intended to limit the scope of the invention and they should not be so interpreted. Amounts are in weight parts or weight percentages unless otherwise indicated.

Example 1

Preparation of UF-PVA 205 (58-5) Colloid from Formaldehyde and PVA Solid (Pre-Mixing)

Methanol (4.6 g), 50% formaldehyde (341.3 g), water (46.0 g) and Selvol 205 (16.7 g) were charged into a 1000-mL flask. The mixture was heated to 80° C. for approximately 2 hours at initial pH of ~4 until a clear to hazy liquid was obtained. After the pH was adjusted using triethylamine and triethanolamine to about 8.5, urea granule (141.3 g) was charged into the flask. The pH was adjusted to 8~9 and the mixture was heated to 90° C. until the resin gave a cloudy appearance upon cooling to 25° C. Next, the pH was adjusted to 5~6 and the mixture was heated to 100° C. Thereafter, the viscosity was measured every 15 minutes. The temperature was reduced to 60° C. and the pH was adjusted to ~7.5 using NaOH solution when a desirable viscosity from 800 to 1,000 cPs was obtained and the water-based resin remained clear to hazy at ambient temperatures. Urea (69.15 g) was charged into the flask and stirred for a few minutes to obtain a clear to hazy liquid. The final product was either a clear or a hazy liquid. The solid content was ~58%, and PVA content of the total solid ~5%. The pH was ~7 and the viscosity from 800 cPs. Free formaldehyde content was ~0.2% after 72 hours. Selvol 205 is a polyvinyl alcohol available from Sekisui Specialty Chemicals.

Example 2

Preparation of UF-PVA 205 (58-5) Colloid from UFC 85 and Solid PVA (Pre-Mixing)

UFC 85 (699.7 g), methanol (11.4 g), water (356.0 g) and Selvol 205 (40.4 g) were charged into a 2000-mL flask. The pH was adjusted using triethylamine and triethanolamine to about 8.5. The mixture was heated to 60° C. for approximately 2 hours to obtain a clear to hazy liquid. Urea granules (170.7 g) were charged into the flask. The mixture was heated to 80° C. and the pH was maintained at ~8.5 until the resin gave a cloudy appearance upon cooling to 25° C. Subsequently, the pH was adjusted to 5~6 and the mixture was heated to 100° C. Thereafter, the viscosity was measured every 15 minutes. The temperature was reduced to 60° C. and the pH was adjusted to ~7.5 using NaOH solution when a desirable viscosity from 800 to 1,000 cPs was obtained and the water-based resin remained clear to hazy at ambient temperatures. Urea (164.1 g) was charged into the flask and stirred for a few minutes to obtain a clear to hazy liquid. The final product was either a clear or a hazy liquid. The total solid content was ~58%, and PVA content of the total solid ~5%. The pH was ~7, and the viscosity ~1,000 cPs. Free formaldehyde content was ~0.2%.

Example 3

Preparation of UF-PVA 205 (58-4.5) Colloid from UFC 85 and Solid PVA (Pre-Mixing)

UFC 85 (287.2 g), methanol (4.9 g), water (148.6 g) and Selvol 205 (15.2 g) were charged into a 1000-mL flask. The pH was adjusted using triethylamine and triethanolamine to about 8.5. The mixture was heated to 60° C. for approximately one hour and a clear to hazy liquid was obtained. Urea granules (71.0 g) were charged into the flask. The mixture was heated to 80° C. and the pH was maintained at ~8.5 until the resin gave a cloudy appearance upon cooling to 25° C. Next, the pH was adjusted to 5~6 and the mixture was heated to 100° C. Thereafter, the viscosity was measured every 15 minutes. The temperature was reduced to 60° C. and the pH was adjusted to 7.5 using NaOH solution when a desirable viscosity from 500 to 700 cPs was obtained and the water-based resin remained clear to hazy at ambient temperatures. Urea (65.0 g) was charged into the flask and stirred for a few minutes to obtain a clear to hazy liquid. The final product was either a clear or a hazy liquid. The total solid content was ~58%, and PVA content of the total solid ~4.5%. The pH was ~7, and the viscosity ~500 cPs. Free formaldehyde content was ~0.2% after 72 hours.

Example 4

Preparation of UF-PVA 205 (44-10) Colloid from Formaldehyde and Solid PVA (Pre-Mixing)

Methanol (4.9 g), 50% formaldehyde (341.2 g), water (24.7 g) and Selvol 205 (33.6 g) were charged into a 1000-mL flask. The mixture was heated to 80° C. for approximately 2 hours and a clear to hazy liquid was obtained. Urea (71.0 g) was charged into the flask. The mixture was heated to 80° C. and the pH was maintained at ~8.5 until the resin gave a cloudy appearance upon cooling to 25° C. Next, the pH was adjusted with formic acid to from ~5 to ~6 and the mixture was heated to 100° C. Thereafter, the viscosity was measured every 15 minutes. The temperature was reduced to 60° C. and the pH was adjusted to 7.5 using NaOH solution when the viscosity reached ~600 cPs and the water-based resin remained clear to hazy at ambient temperatures. Urea (69.1 g) and water (93.0 g) were charged into the flask and stirred for a few minutes to obtain a clear to hazy liquid. The final product was a hazy liquid. The solid content was ~44%, and PVA content of the total solid ~10%. The pH was ~7, and viscosity ~1,000 cPs. Free formaldehyde content was ~1.8% after 72 hours.

Example 5

Preparation of UF-PVA 502 (52-10) Colloid from UFC 85 and PVA Solution (Mid-Mixing)

UFC 85 (632.6 g), methanol (13.5 g), water (178.0 g) and urea (156.3 g) were charged into a 2000-mL flask. The mixture was heated to 80° C. and the pH was maintained at ~8.5 until the resin gave a cloudy appearance upon cooling to 25° C. Next, the pH was adjusted with formic acid to from ~5 to ~6 and the mixture was heated to 100° C. Thereafter, the viscosity was measured every 15 minutes until it reached 150 cPs. The clear to hazy mixture was cooled down to 80° C. and then 20% Selvol 502 (373.4 g) was charged into flask. The temperature was maintained at 80° C. and pH about 6 until a desirable viscosity from 300 to 500 cPs was obtained and the water-based resin remained clear to hazy at ambient temperatures. Subsequently, the temperature was reduced to 60° C. and the pH was adjusted to 7.5 using NaOH solution. Urea (151.0 g) was charged into the flask and stirred for a few minutes. The final product was either a clear or a hazy liquid. The total solid content was ~52%, and PVA content of the total solid ~10%. The pH was ~7 and the viscosity ~350 cPs. Free formaldehyde content was ~0.2% after 72 hours. Selvol 502 is a polyvinyl alcohol available from Sekisui Specialty Chemicals.

Example 6

Preparation of UF-PVA 502 (58-5) Colloid from UFC 85 and PVA Solution (Mid-Mixing)

UFC 85 (632.5 g), methanol (10.7 g), water (178.0 g) and urea (156.3 g) were charged into a 2000-mL flask. The mixture was heated to 80° C. and the pH was maintained at ~8.5 until the resin gave a cloudy appearance upon cooling to 25° C. Next, the pH was adjusted with formic acid to 5~6 and the mixture was heated to 100° C. Thereafter, the viscosity was measured every 15 minutes until the viscosity reached ~150 cPs. The clear to hazy mixture was cooled down to 80° C. and then 20% Selvol 502 (187.4 g) was charged into flask. The temperature was maintained at 80° C. and pH ~6. The temperature was reduced to 60° C. and the pH was adjusted to 7.5 using NaOH solution when the water-based resin remained clear to hazy at ambient temperatures and the viscosity reached ~250 cPs. Urea (152.0 g) was charged into the flask and stirred for a few minutes. The final product was either a clear or a hazy liquid. The total solid content was 58%, the PVA content of the total solid ~5%. The pH was ~7 and viscosity ~200 cPs. Free formaldehyde content was ~0.2% after 72 hours.

Example 7

Preparation of UF-PVA 205 (58-5) Colloid From UFC 85 and PVA Solution (Mid-mixing)

UFC 85 (631.9 g), water (165.5 g) and urea (145.0 g) were charged into a 2000-mL flask. The mixture was heated to 80° C. and the pH was maintained at ~8.5 until the resin gave a cloudy appearance upon cooling to 25° C. Next, the pH was adjusted with formic acid to from ~5 to ~6 and the mixture was heated to 100° C. Thereafter, the viscosity was measured every 15 minutes until the viscosity reached ~150 cPs. The clear to hazy mixture was cooled down to 80° C. and then 20% Selvol 205 (184.2 g) was charged into flask. The temperature was maintained at 80° C. and pH at ~6 until the viscosity reached 500 cPs and the water-based resin remained clear to hazy at ambient temperatures. Next, the temperature was reduced to 60° C. and the pH was adjusted to 7.5 using NaOH solution. Urea (151.0 g) was charged into the flask and stirred for a few minutes to obtain a clear to hazy liquid. The final product was either a clear or a hazy liquid. The solid content was ~58%, and PVA content of the total solid ~5%. The pH was ~7 and the viscosity ~500 cPs. Free formaldehyde content was ~0.2% after 72 hours.

Example 8

Preparation of UF-PVA 513 (58-2) Colloid from UFC 85 and PVA Solution (Mid-Mixing)

UFC 85 (632.3 g), water (178.1 g) and urea (156.4 g) were charged into a 2000-mL flask. The mixture was heated to 80° C. and the pH was maintained at ~8.5 until the resin gave a cloudy appearance upon cooling to 25° C. Next, the pH was adjusted with formic acid to 5~6 and the mixture was heated to 100° C. Thereafter, the viscosity was measured every 15 minutes until the viscosity reached 150 cPs. The clear to hazy mixture was cooled down to 80° C. and then 20% Selvol 513 (184.2 g) was charged into flask. The temperature was maintained at 80° C. and pH at ~6 until the water-based resin remained clear to hazy at ambient temperatures and the viscosity reached ~250 cPs. Next, the temperature was reduced to 60° C. and the pH was adjusted to 7.5 using NaOH solution. Urea (151.0 g) was charged into the flask and stirred for a few minutes to obtain a clear to hazy liquid. The final product was either a clear or a hazy liquid. The solid content was ~58%, and PVA content of the total solid ~2%. The pH value was ~7 and the viscosity ~250 cPs. Free formaldehyde content was ~0.2% after 72 hours. Selvol 513 is a polyvinyl alcohol available from Sekisui Specialty Chemicals.

Preparation of UF Precursor from UFC 85

UFC 85 (586.8 g), water (89.9 g) and urea (91.3 g) were charged into a 1000-mL flask. The mixture was heated to 80° C. and the pH was maintained at ~8.5 until the resin gave a cloudy appearance upon cooling to 25° C. Next, the pH was adjusted with formic acid to from ~5 to ~6 and the mixture was heated to 100° C. Thereafter, the viscosity was measured every 15 minutes until the viscosity reached ~200 cPs was obtained. The final product was a hazy liquid; the solid content was ~60%.

Example 9

Preparation of UF-PVA 502 (58-5) Colloid from the UF Precursor and PVA Solution (Mid-Mixing)

The UF precursor (107.9 g) and 20% Selvol 502 (20.5 g) were charged into a 500-mL flask and a cloudy mixture was formed. The pH was adjusted using formic acid to 6 and the mixture was heated to 80° C. Thereafter, the viscosity was measured every 15 minutes until the viscosity about 200 cPs was obtained and the water-based resin remained clear to hazy at ambient temperatures. Next, the temperature was reduced to 60° C. and the pH was adjusted to 7.5 using NaOH solution. Urea (16.0 g) was charged into the flask and stirred for a few minutes to obtain a clear to hazy liquid. The final product was either a clear or a hazy liquid. The solid content was 58%, and PVA content of the total solid ~5%. The pH value was ~7 and the viscosity ~140 cPs. Free formaldehyde content was ~0.2% after 72 hours.

Example 10

Preparation of UF-PVA 203 (58-5) Colloid from the UF Precursor and PVA Solution (Mid-Mixing)

The UF precursor (107.0 g) and 20% Selvol 203 (20.2 g) were charged into a 500-mL flask and a cloudy mixture was formed. The pH was adjusted with formic acid to 6 and the mixture was heated to 80° C. Thereafter, the viscosity was measured every 15 minutes until the viscosity reached about 200 cPs and the water-based resin remained clear to hazy at ambient temperatures. Next, the temperature was reduced to 60° C. and the pH was adjusted to 7.5 using NaOH solution. Urea (16.5 g) was charged into the flask and stirred for a few minutes to obtain a clear to hazy liquid. The final product was either a clear or a hazy liquid. The solid content was 58%, and PVA content of the total solid ~5%. The pH was ~7 and the viscosity ~150 cPs. Free formaldehyde content was ~0.2% after 72 hours. Selvol 203 is a polyvinyl alcohol available from Sekisui Specialty Chemicals.

Example 11

Preparation of UF-PVA 504 (58-5)-Colloid from the UF Precursor and PVA Solution (Mid-Mixing)

The UF precursor (106.9 g) and 20% Selvol 504 (20.7 g) were charged into a 500-mL flask and a cloudy mixture was formed. The pH was adjusted with formic acid to 6 and the mixture was heated to 80° C. Thereafter, the viscosity was measured every 15 minutes until the viscosity was about 200 cPs and the water-based resin remained clear to hazy at ambient temperatures. Next, the temperature was reduced to 60° C. and the pH was adjusted to 7.5 using NaOH solution. Urea (16.5 g) was charged into the flask and stirred for a few minutes to obtain a clear to hazy liquid. The final product was either clear or hazy liquid. The solid content was 58%, and PVA content of the total solid ~5%. The pH value was ~7 and the viscosity ~180 cPs. Free formaldehyde content was ~0.2% after 72 hours. Selvol 504 is a polyvinyl alcohol available from Sekisui Specialty Chemicals.

Example 12

Preparation of UF-PVA 205 (58-5) Colloid from the UF Precursor and PVA Solution (Mid-Mixing)

UF precursor (2724-157) (106.0 g) and 20% Selvol 205 (20.4 g) were charged into a 500-mL flask and a cloudy mixture was formed. The pH was adjusted with formic acid to ~6 and the mixture was heated to 80° C. Thereafter, the viscosity was measured every 15 minutes until the viscosity reached approximately 400 cPs and the water-based resin remained clear to hazy at ambient temperatures. Next, the temperature was reduced to 60° C. and the pH value was adjusted to 7.5 using NaOH solution. Urea (16.3 g) was charged into the flask and stirred for a few minutes to obtain a clear to hazy liquid. The final product was either a clear or a hazy liquid. The solid content was 58%, and PVA content of the total solid ~5%. The pH value was ~7 and the viscosity ~380 cPs. Free formaldehyde content was ~0.2% after 72 hours.

Comparative Example A

Baseline UF

UF-127 (or UF-472X) is a commercial UF resin available from Momentive Specialty Materials Inc. and was used as the experimental baseline.

Comparative Example B

Control UF-Latex

A mixture of UT-472X and commercial Rhoplex RL-720 emulsion (4% or 10% by weight of the solid based on the total solids) was used as an experimental control. Rhoplex RL-720 is a commercial product produced by The Dow Chemical Company.

Example 13

Preparation of UF-HEC WP-09L (60-2) Colloid from UFC 85 and HEC Solution (Pre-Mixing)

UFC 85 (632.3 g), methanol (10.3 g), water (100.2 g) and 10% HEC WP-09 (168.8 g) were charged into a 1000-mL flask. The pH was adjusted using triethylamine and triethanolamine to about 8.5. The mixture was heated to 60° C. for approximately 30 minutes and a clear to hazy liquid was obtained. Urea (156.5 g) was charged into the flask. The mixture was maintained at 60° C. and the pH was maintained at ~8.5 until it became cloudy at 25° C. Next, the pH was adjusted to from ~5 to ~6 and the mixture was heated to 100° C. Thereafter, the viscosity was measured every 15 minutes until the reaction mixture became a clear or hazy liquid. The temperature was reduced to 60° C. and the pH was adjusted to 7.5 using NaOH when a desirable viscosity reached to about 1,000 cPs and the water-based resin remained hazy or translucent, but no phase separation at ambient temperatures. Urea (150.2. g) was charged into the flask and stirred for a few minutes to obtain a translucent liquid. The total solid content was ~60%, and HEC content of the total solid ~2%. The pH was ~7, and the viscosity ~1,200 cPs. Free formaldehyde content ~0.2% after 72 hours.

Example 14

Preparation of UF-HEC WP-09L (60-3) Colloid from UFC 85 and HEC Solution (Pre-Mixing)

UFC 85 (287.7 g), methanol (5.1 g), water (17.6 g) and 10% HEC WP-09 (114.8 g) were charged into a 500-mL flask. The pH was adjusted using triethylamine and triethanolamine to about 8.5. The mixture was heated to 60° C. for approximately 30 minutes and a clear to hazy liquid was obtained. Urea (70.9 g) was charged into the flask. The mixture was maintained at 80° C. and the pH was maintained at ~8.5 until it became cloudy at 25° C. Next, the pH was adjusted to 5~6 and the mixture was heated to 100° C. Thereafter, the viscosity was measured every 15 minutes until the reaction mixture became a clear or hazy liquid. The temperature was reduced to 60° C. and the pH was adjusted to 7.5 using NaOH when a desirable viscosity reached to about 1,500 cPs and the water-based resin remained hazy or translucent, but no phase separation at ambient temperatures. Urea (68.1 g) was charged into the flask and stirred for a few minutes to obtain a translucent liquid. The total solid content was ~60%, and HEC content of the total solid ~2%. The pH was ~7, and the viscosity ~1,800 cPs. Free formaldehyde content ~0.2% after 72 hours.

Example 15

Preparation of UF-HEC WP-09L (52-4) Colloid from UFC 85 and HEC Solution (Pre-Mixing)

UFC 85 (258.2 g), water (74.2 g) and 10% HEC WP-09 (137.3 g) were charged into a 1000-mL flask. The pH was adjusted using triethylamine and triethanolamine to about 8.5. The mixture was heated to 60° C. for approximately 30 minutes and a clear to hazy liquid was obtained. Urea granules (63.9 g) were charged into the flask. The mixture was maintained at 80° C. and the pH was maintained at ~8.5 until it became cloudy at 25° C. Next, the pH was adjusted to 5~6 and the mixture was heated to 100° C. Thereafter, the viscosity was measured every 15 minutes until the reaction mixture became a clear or hazy liquid. The temperature was reduced to 60° C. and the pH was adjusted to 7.5 using NaOH when a desirable viscosity reached to about 500 cPs and the water-based resin remained haze or translucent, but no phase separation at ambient temperatures. Urea (62.0 g) was charged into the flask and stirred for a few minutes to obtain a hazy liquid. The total solid content was ~52%, and HEC content of the total solid ~4%. The pH was ~7, and the viscosity 500 cPs. Free formaldehyde content ~0.2% after 72 hours.

Preparation and Testing of Glass Mat Hand Sheets for Examples 1-15

Preparation of 18% UF-PVA Binders

Concentrated UF-PVA colloid (~58% by weight) was diluted with D.I. water to ~18% by weight. The liquid binder was a clear to hazy liquid and the viscosity was less than 8 cPs. The diluted colloid provided approximately 10 days shelf life.

Treatment of Glass Fiber

According to moisture content measured on Cenco moisture balance, 7.7 g of wet glass fiber OC9501 (Owens Corning) with an average ¾ inch (19 mm) length and 18 micron diameter were immersed in 40 g of D.I. water with 0.6 g of Rhodia VP-532/SPB for at least 2 hours.

Preparation of Glass Mat Hand Sheet

The treated glass fiber was placed into 8 gallon (30 liters) of warm water about 50° C. in a 17-gallon (64-liter) vessel equipped with a mechanical agitator under agitation at 500 rpm for 30 seconds, and then 400 g of 0.23% of Cytec Superfloc A-130 Flocculent solution was added into the vessel under the agitation for 60 seconds. The glass fiber slurry was introduced onto a 12×12 inch (30.5×30.5 cm) fabric mat casting mode equipped with a wire support mesh with a plastic fabric. The wet glass mat with the plastic fabric was passed through a vacuum slot to remove excess water. The liquid binder containing ~18% solid by weight was applied on the wet glass mat and passed through the vacuum slot again to remove excess binder for a desirable weight based on the certain LOI (Loss on ignition). A wet glass mat with binder was cured on Methis Labdryer at 375° F. (190° C.) for 3 minutes or 400° F. (205° C.) for 3 minutes.

Measurement of Properties of Glass Mat Samples

Dry Tensile Strength (DT)

The cured glass mat hand sheet was cut in 1.5×4.0 inch (3.81×10.16 cm) rectangular specimen. Total eighteen specimens from three hand sheets were measured on Instron 5566 to get an average tensile strength.

Wet Tensile Strength (WT)

The cured glass mat hand sheet was cut in 1.5×4.0 inch (3.81×10.16 cm) rectangular specimen. Total eighteen specimens from three hand sheets were soaked in water at 80° C. for 10 min in a Microprocess Controlled 280 water bath (Precision). Excess of water in the specimen was removed with paper towel. The specimens were immediately measured on the Instron.

Tear Test

The cured glass mat hand sheet was cut in 2.5×12.0 inch (6.35×30.48 cm) rectangular specimen. Three specimens from three hand sheets were measured on Elmendorf Tearing Tester (Thwing-Albert Instrument Co.) in six times to get an average measurement.

Caliper Test (Caliper—Thickness)

The cured glass mat hand sheet was cut in 1.5×4.0 inch (3.81×10.16 cm) rectangular specimen. Total twenty one sheets from three hand sheets as one specimen were measured on a Mahr Federal dial drop indicator and an average thickness of a single sheet was obtained. Average thickness for individual sheet ranged from 35 to 40 mils (0.89 to 1.02 mm).

Wet Web Strength (WWS)

After the liquid binder was applied on 12.0×12.0 inch (30.5×30.5 cm) square glass sheet hand sheet, the glass sheet was vacuumed to the desirable wet weight based on a certain LOI (Loss on ignition). The wet sheet was laid over a sheet of plastic with a 6-inch (15.2 cm) diameter hole in the center. A clear plastic sheet ¼" (0.64 cm) thick with an identical 6-inch (15.24 cm) diameter hole was placed on top of the hand sheet to secure it. A 2⅛" (5.4 cm) diameter disc holding a paper cup was then centered over the hole and gently lowered onto the hand sheet. Water from a 250 ml burette was added at a constant rate to the cup until the web elongates a vertical distance of 24 mm and touches to the bottom plastic plate. The wet web strength in grams was the weight of the cup plus the added water at the "sag" point.

TABLE 1

Performance of Control (UF-Latex) and Baseline (UF resin)

| Sample | LOI, % | C-WT | WT | C-DT | DT | C-Tear | Caliper | Wet-web | Cure conditions |
|---|---|---|---|---|---|---|---|---|---|
| UF | 18.9 | 30.3 | 30.2 | 51.8 | 51.7 | 266 | 381 | 82 | 375° F./3 min |
|  | 19.4 | 31.9 | 32.7 | 45.3 | 46.6 | 284 | 37.4 |  | 400° F./3 min |

TABLE 1-continued

Performance of Control (UF-Latex) and Baseline (UF resin)

| Sample | LOI, % | C-WT | WT | C-DT | DT | C-Tear | Caliper | Wet-web | Cure conditions |
|---|---|---|---|---|---|---|---|---|---|
| UF-127/GL 720 4% | 18.9 | 37.5 | 37.4 | 72.1 | 71.8 | 289 | 40.0 | 194 | 375° F./3 min |
|  | 18.5 | 50.0 | 48.8 | 72.3 | 70.6 | 278 | 40.6 |  | 400° F./3 min |
| UF-127/GL-720(10%) | 19.2 | 49.8 | 50.6 | 77.4 | 78.6 | 263 | 40.4 | 173 | 375° F./3 min |
|  | 18.5 | 52.8 | 51.5 | 76.8 | 75.0 | 282 | 39.5 |  | 400° F./3 min |

C-WT Corrected Wet Tensile, lbf/1.5"
C-DT Corrected Dry Tensile, lbf/1.5"
C-Tear Corrected Tear Test, gf
Caliper Thickness, mil
WT Wet Tensile, lbf/1.5"
DT Dry Tensile, lbf/1.5"
W-Web Wet Web Strength, g/f
LOI Loss on Ignition

TABLE 2

Performance of UF-PVA Colloid on Glass Mat

| Sample/experiment | LOI % | C-WT | WT | C-DT | DT | C-Tear | Caliper | Wet-web | Cure conditions |
|---|---|---|---|---|---|---|---|---|---|
| Example 7 | 19.1 | 51.8 | 52.1 | 84.7 | 85.2 | 339 | 38.7 | 212.1 | 375° F./3 min |
|  | 19.1 | 52.4 | 52.7 | 81.0 | 81.5 | 344 | 39.4 |  | 400° F./3 min |
| Example 6 | 19.1 | 50.7 | 51.0 | 80.4 | 80.9 | 305 | 39.4 | 133.8 | 375° F./3 min |
|  | 19.0 | 38.7 | 38.8 | 64.9 | 65.1 | 291 | 39.4 |  | 400° F./3 min |
| Example 5 | 19.0 | 54.3 | 54.5 | 82.9 | 83.2 | 314 | 37.8 | 183.8 | 375° F./3 min |
|  | 18.9 | 58.2 | 58.2 | 80.3 | 80.2 | 333 | 37.9 |  | 400° F./3 min |
| Example 8 | 19.0 | 47.3 | 47.3 | 73.5 | 73.6 | 281 | 38.3 | 119.4 | 375° F./3 min |
|  | 18.9 | 51.1 | 51.0 | 67.8 | 67.8 | 315 | 39.0 |  | 400° F./3 min |
| Example 2 | 19.0 | 62.8 | 62.9 | 88.2 | 88.3 | 449 | 36.3 | 193.6 | 375° F./3 min |
|  | 19.0 | 60.5 | 60.5 | 85.4 | 85.5 | 427 | 35.4 |  | 400° F./3 min |

C-WT Corrected Wet Tensile, lbf/1.5"
C-DT Corrected Dry Tensile, lbf/1.5"
C-Tear Corrected Tear Test, gf
Caliper Thickness, mil
WT Wet Tensile, lbf/1.5"
DT Dry Tensile, lbf/1.5"
W-Web Wet Web Strength, g/f
LOI Loss on Ignition The data are rounded.

Example 16

Preparation of UF-PVA 502 (50-13-4) Colloid by Grafting UF on PVA (Post Mixing)

60.4 g of UF resin FG-127 (65% solid) and 30.0 g of 20% Selvol 502 solution were charged into a 250-mL flask to form a two-phase mixture. The mixture was heated at 80° C. for 4 hours at an initial pH of ~7.5 to obtain a clear liquid. The liquid became a white opaque colloid after cool down. Total solid content was 50% by weight and PVA content was 13.3% of the total solid. Viscosity was 821 cPs, and the pH value was 6.69.

Example 17

Preparation of UF-PVA 502 (50-13-2) Colloid by Reaction of UF with PVA (Post Mixing)

100.5 g of UF resin FG-127 (65% solid) and 40.0 g of water were charged into a 250-mL flask, 10.0 g of Selvol 502 granules was introduced into the flask with agitation at ambient temperature. The mixture was heated at 80° C. for 2 hours at an initial pH of ~7.5 to form a clear liquid. It became a white opaque colloid after cool down. The total solid content of the colloid was 50% by weight and PVA content was 13.3% of the total solid. Viscosity was 225 cPs, and pH was 6.74.

Example 18

Preparation of UF-PVA 502 (55-10-3) Colloid by Reaction of UF with PVA (Post Mixing)

855.0 g of UF resin FG-127 (65% by solid) and 206.1 g of water were charged into a 2000-mL flask, 61.8 g of Selvol 502 granules was introduced into the flask with agitation at ambient temperature. The mixture was heated at 80° C. for 3 hours at initial pH ~7.5 to form a clear liquid. It became a stable white opaque colloid after cool down. Viscosity was 790 cPs, and pH was 6.80. Total solid content of the colloid was 55% by weight and PVA content was 10% of the total solid. The product was diluted to 17.6% solid content prior to the use. Viscosity was 5.6 cPs, and pH was 6.75.

Example 19

Preparation of UF-PVA 513 (50-8-2) Colloid by Reaction of UF with PVA (Post Mixing)

921.8 g of UF resin FG-127 (65% by weight) and 328.4 g of water were charged into a 2000-mL flask, 52.0 g of Selvol 513 was introduced into the flask with agitation at ambient temperature. The mixture was heated at 80° C. for 2 hours at an initial pH of ~7.5 to form a clear liquid. The liquid became a stable white opaque colloid after cool down. Total solid content of colloid was 50% by weight and PVA content was 8.0% of the total solid. Viscosity was 1,080 cPs, pH was 6.95. The product was diluted to 16% solid content prior to the use. Viscosity was 12.4 cps, and pH was 6.84.

Example 20

Preparation of UF-PVA 502 (60-5-3) Colloid by Reaction of UF with PVA (Post Mixing)

759.1 g of UF resin FG-127 (65% by solid) and 80.7 g of water were charged into a 2000-mL flask, 26.0 g of Selvol 502 was introduced into the flask with agitation at ambient temperature. The mixture was heated at 80° C. for 3 hours at initial pH ~7.5 to form a clear liquid. The liquid became a stable white opaque colloid after cool down. Viscosity was 1,250 cPs, and pH was 6.99. Total solid content of the colloid was 60% by weight and PVA content was 5% of the total solid. The product was diluted to 17.6% solid content prior to use. Viscosity was 3.7 cPs, and pH was 6.79.

Example 21

Preparation of UF-PVA 513 (55-4-3) (Colloid by Reaction of UF with PVA (Post Mixing)

736.3 g of UF resin FG-127 (65% by weight) and 150.6 g of water were charged into a 2000-mL flask, 20.0 g of Selvol 513 was introduced into the flask with agitation at ambient temperature. The mixture was heated at 80° C. for 3 hours at initial pH ~7.5 to form a clear liquid. It became a stable white opaque colloid after cool down. Total solid content of colloid was 50% by weight and PVA content was 4.0% of the total solid. Viscosity was 1,130 cPs, pH was 6.93. The product was diluted to 16% solid content prior to the use. Viscosity was 3.7 cps, and pH was 6.79.

Example 22

Preparation of UF-HEC WP-09L (50-8-1.5) Colloid by Reaction of UF with HEC (Post Mixing)

885.5 g of UF resin FG-127 (65% by weight) and 316.2 g of water were charged into a 2000-mL flask, 50.0 g of HEC WP-09L powder was introduced into the flask with agitation at ambient temperature. The mixture was heated at 80° C. for 1.5 hours at initial pH ~7.5 to form a clear slightly yellow liquid. It became an off-white opaque colloid after cool down. Viscosity was 7,538 cps, and pH was 6.92. The total solid content of the colloid was 50% by weight and HEC content was 8.0% of the total solid. The colloid was diluted with water to 14% solid content prior to the use. Viscosity was 12.5 cPs, and pH value was 6.8.

Example 23

Preparation of UF-PVA 205 (55-5-2.5) Colloid by Reaction of UF with PVA (Post Mixing)

877.8 g of UF resin FG-127 (65% by weight) and 184.7 g of water were charged into a 2000-mL flask, 30.0 g of Selvol 205 was introduced into the flask with agitation at ambient temperature. The mixture was heated at 80° C. for 2.5 hours at initial pH ~7.5 to form a clear liquid. It became a white opaque colloid after cool down. The pH was adjusted with dimethylaminoethanol from 6.94 to 7.73. Viscosity was 374 cPs. Total solid content of the colloid was 55% by weight and PVA content was 5.0% of the total solid. The product was diluted to 17% solid content prior to the use. Viscosity was 4.14 cps, pH value was 7.70.

Comparative Example C

Preparation of UF-Latex RL-720 (4%) Binder as a Control Sample 699.9 g of UF resin FG-127 (65% by weight), 40.6 g of GL-720 (47% solid), and 1894.0 g of D.I. water were mixed in a 3000-mL container to give a milky white liquid. Total solid content of the liquid was 18%, by weight and latex RL-720 was 4% by weight of the total solid. Viscosity was 2.34 cPs, pH value was 7.23.

Comparative Example D

Preparation of UF-Latex RL-720 (10%) Binder as a Control Sample 650.0 g of UF resin FG-127 (65% by weight), 100.1 g of GL-720 (47% solid), and 1857.3 g of D.I. water were mixed in a 3000-mL container to give a milky white liquid. Total solid content of the liquid was 18% by weight and latex RL-720 was 10% by weight of the total solid. Viscosity was 2.31 cPs, pH value was 6.82.

Comparative Example E

Preparation of UF-PVA 205 Solution (10%) Binder as a Control Sample 600.0 g of UF resin FG-127 (65% by weight), 263.8 g of D.I. water, and 216.0 g of 20% Selvol 502 solution were mixed in a 3000-mL flask. The liquid became two phases after stop stirring for a while. Additional water was charged into the mixture to form 20% homogeneous solution. Total solid content of the solution was 20% by weight and PVA was 10% by weight of the total solid. Viscosity was 4.14, and pH was 7.17. A white precipitant was observed after a few hours.

Preparation and Testing of Glass Mat Hand Sheets for Examples 16-Comparative Example E Preparation of 16-18% UF-PVA Colloid Concentrated UF-PVA colloid (50~65% by weight) was diluted with D.I. water to 16-18% by weight. The liquid binder is a white milky colloid with viscosity at 10 cps or less. The diluted colloid provided two days stability without settlement.
Treatment of Glass Fiber
Same as Above
Preparation of Wet Glass Mat
Same as above.
Measurement of Properties of Glass Mat Samples
Dry Tensile Strength (DT)

Same as above
Wet Tensile Strength (WT)
Same as above
Tear Test
Same as above
Caliper Test (Caliper—Thickness)
Same as above.
Wet Web Strength (WWS)

After a 12×12 inch (30.5×30.5 cm) square glass mat hand sheet was casted, it was vacuumed to the target wet weight based on a certain LOT (Loss on ignition). The wet sheet was laid over a sheet of plastic with a 6-inch (15.24 cm) diameter hole in the center. A clear plastic sheet ¼" (0.64 cm) thick with an identical 6-inch (15.24 cm) diameter hole was placed on top of the hand sheet to secure it. A 2⅛" (5.4 cm) diameter disc holding a paper cup was then centered over the hole and gently lowered onto the hand sheet. Water from a 250 ml burette was added at a constant rate to the cup until the web *elongates* a vertical distance of 24 mm and touches to the bottom plastic plate. The wet web strength in grams was the weight of the cup plus the added water at the "Sag" point.

TABLE 3

Properties of Control Sample of UF-Latex (FG-127-Rhoplex™ RL720)

| Sample | LOI | WT | DT | Tear | Caliper | WWS | Cure Condition |
|---|---|---|---|---|---|---|---|
| FG-127/GL-720(4) | 18.9 | 37.4 | 71.8 | 289 | 40.0 | 194 | 375° F. (190° C.)/3 min |
| Comp Ex. C | 18.5 | 48.8 | 70.6 | 278 | 40.6 | | 400° F. (205° C.)/3 min |
| FG-127/GL-720(10) | 19.2 | 50.6 | 78.6 | 263 | 40.4 | 173 | 375° F. (190° C.)/3 min |
| Comp Ex. D | 18.5 | 51.5 | 75.0 | 282 | 39.5 | | 400° F. (205° C.)/3 min |

LOI: Loss on Ignition, %
DT: Dry Tensile Strength, lbf/1.5" width
Caliper: Thickness, mil
UF resin FG-127 and FG-472X are identical Momentive products.
Tear: Tear Strength, gf
WT: Wet Tensile Strength, lbf/1.5" width
WWS: Wet Web Strength, gf

TABLE 4

Properties of UF-PVA Solution

| Sample | LOI | WT | DT | Caliper | WWS | Cure Condition |
|---|---|---|---|---|---|---|
| FG-127/PVA 502(10) solution | 19.0 | 55.0 | 85.4 | 38.4 | 188 | 375° F. (190° C.)/3 min |
| Comp Ex. E) | 19.02 | 56.6 | 85.0 | 35.7 | | 400° F. (205° C.)/3 min |

LOI: Loss on Ignition, %
DT: Dry Tensile Strength, lbf/1.5" width
Caliper: Thickness, mil
UF resin FG-127 and FG-472X are identical Momentive products.
WT: Wet Tensile Strength, lbf/1.5" width
WWS: Wet Web Strength, gf

TABLE 5

Properties of Glass Mat with UF Derivative Colloids

| Sample | LOI | WT | DT | Tear | Caliper | WWS | Cure Condition |
|---|---|---|---|---|---|---|---|
| FG-127Selvol502(55-10-3) | 18.9 | 54.1 | 81.3 | 366 | 36.4 | 168 | 375° F. (190 C.)/3 min |
| Ex. 18 | 19.0 | 57.6 | 75.6 | 333 | 35.7 | | 400° F. (205 C.)/3 min |
| FG-127/Selvol513(50-8-2) | 18.6 | 50.7 | 93.1 | 372 | 36.5 | 204 | 375° F. (190 C.)/3 min |
| Ex. 19 | 18.9 | 59.8 | 88.7 | 328 | 36.3 | | 400° F. (205 C.)/3 min |
| FG-127/Selvol502(60-5-3) | 18.8 | 49.2 | 69.8 | 362 | 34.6 | 194 | 375° F. (190 C.)/3 min |
| Ex. 20 | 18.8 | 55.5 | 75.0 | 382 | 36.6 | | 400° F. (205 C.)/3 min |
| FG-127/Selvol513(55-4-3) | 20.2 | 78.3 | 95.0 | 282 | 37.9 | 466 | 375° F. (190 C.)/3 min |
| Ex. 21 | 20.0 | 75.4 | 94.1 | 329 | 35.3 | | 400° F. (205 C.)/3 min |
| FG-127/Selvol205(55-5-2.5) | 18.9 | 52.6 | 91.1 | 390 | 34.0 | 229 | 375° F. (190 C.)/3 min |
| Ex. 22 | 19.0 | 60.7 | 85.7 | 337 | 35.5 | | 400° F. (205 C.)/3 min |
| FG-127/WP-09 (50-8-1.5) | 18.9 | 32.2 | 65.1 | 336 | 36.9 | 126 | 375° F. (190 C.)/3 min |
| Comp Ex. C | 19.1 | 41.7 | 65.9 | 336 | 37.5 | | 400° F. (205 C.)/3 min |

LOI: Loss on Ignition, %
DT: Dry Tensile Strength, lbf/1.5" width
Caliper: Thickness, mil
UF resin FG-127 and FG-472X are an identical Momentive products.
Tear: Tear Strength, gf
WT: Wet Tensile Strength, lbf/1.5" width
WWS: Wet Web Strength, gf The data are rounded.

What is claimed is:

1. A binder prepared using a method selected from the group consisting of:
   (A) admixing polyvinyl alcohol with a component selected from the group consisting of:
      a solution of formaldehyde, and
      a urea/formaldehyde concentrate,
   to form a first liquid working admixture and then
      admixing the first liquid working admixture with urea under reaction conditions sufficient to initiate a methylolation reaction to form a reaction product admixture of the first liquid working admixture with urea; and
      subjecting the reaction product admixture to reaction conditions sufficient to initiate a condensation to form a polyvinyl alcohol and urea-formaldehyde resin colloid;
   (B) admixing a component selected from the group consisting of:
      a solution of formaldehyde, and
      a urea/formaldehyde concentrate,
      with urea under reaction conditions sufficient to initiate a methylolation reaction to form a reaction product admixture;
      subjecting the reaction product admixture to reactions conditions sufficient to initiate condensation to form a second reaction product admixture; and
      admixing the second reaction product admixture with polyvinyl alcohol to from a urea-formaldehyde resin colloid; and
   (C) adding polyvinyl alcohol to a urea-formaldehyde resin under reaction conditions sufficient to condense the polyvinyl alcohol and the urea-formaldehyde resin to produce a polyvinyl alcohol and urea-formaldehyde resin colloid wherein the addition of polyvinyl alcohol is at a concentration sufficiently low to be compatible with the urea-formaldehyde resin solution into which it is being placed;
      measuring a property of the polyvinyl alcohol grafted urea-formaldehyde resin;
      determining whether the property of the polyvinyl alcohol grafted urea-formaldehyde resin meets a predetermined standard and taking an action selected from the group consisting of:
         (a) if the property of the polyvinyl alcohol grafted urea-formaldehyde resin meets the predetermined standard, stop processing; and
         (b) if the property of the polyvinyl alcohol grafted urea-formaldehyde resin does not meet the predetermined standard, further processing the polyvinyl alcohol grafted urea-formaldehyde resin, the further processing comprising:
            adding additional polyvinyl alcohol to the polyvinyl alcohol and urea-formaldehyde resin colloid under reaction conditions, sufficient to condense the polyvinyl alcohol and the polyvinyl alcohol and urea-formaldehyde resin colloid to produce a further processed polyvinyl alcohol and urea-formaldehyde resin colloid wherein the addition of polyvinyl alcohol is at a concentration compatible with the polyvinyl alcohol and urea-formaldehyde resin colloid into which it is being placed;
            measuring a property of the further processed polyvinyl alcohol and urea-formaldehyde resin colloid;
            comparing the property of the further processed polyvinyl alcohol and urea-formaldehyde resin colloid to a predetermined standard; and
            repeating the further processing until the further processed polyvinyl alcohol and urea-formaldehyde resin colloid meets the predetermined standard.

2. The binder of claim 1 further comprising completing the processes (A) or (B) by making a urea post addition.

3. The binder of claim 1, wherein the polyvinyl alcohol used to prepare the binder has a weight average molecular weight of from about 1,000 to about 200,000.

4. The binder of claim 3, wherein the polyvinyl alcohol has a weight average molecular weight of from about 1,000 to about 50,000.

5. The binder of claim 1, wherein the methylolation reactions occur at a temperature of about 80° C. and a pH of from about 8.5 to about 9.5.

6. The binder of claim 5, wherein the pH is adjusted using triethylamine and triethanolamine.

7. An article of manufacture comprising an article prepared using the binder of claim 1.

8. The article of manufacture of claim 7 wherein the article of manufacture is a shingle.

* * * * *